United States Patent
Reith et al.

(10) Patent No.: US 10,213,767 B2
(45) Date of Patent: Feb. 26, 2019

(54) CATALYST FOR PURIFYING THE EXHAUST GASES OF DIESEL ENGINES

(71) Applicant: UMICORE AG & CO. KG, Hanau-Wolfgang (DE)

(72) Inventors: Christoph Reith, Motten (DE); Birgit Friedrich, Otzberg (DE); Christoph Hengst, Butzbach (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 15/886,143

(22) Filed: Feb. 1, 2018

(65) Prior Publication Data
US 2018/0221855 A1 Aug. 9, 2018

(30) Foreign Application Priority Data
Feb. 3, 2017 (EP) .................................. 17154563

(51) Int. Cl.
*F01N 3/28* (2006.01)
*B01J 23/44* (2006.01)
(Continued)

(52) U.S. Cl.
CPC ............ *B01J 23/44* (2013.01); *B01D 53/944* (2013.01); *B01D 53/945* (2013.01);
(Continued)

(58) Field of Classification Search
CPC .... F01N 2370/02; F01N 3/2066; B01J 23/44; B01J 35/0006; B01J 23/42; B01D 53/9472; B01D 53/9468
(Continued)

(56) References Cited

U.S. PATENT DOCUMENTS 5,120,695 A * 6/1992 Blumrich ........... B01D 53/8643
502/78
5,354,720 A 10/1994 Leyrer et al.
(Continued)

FOREIGN PATENT DOCUMENTS

DE 102016110999 A1 12/2016
EP 0559021 A2 9/1993
(Continued)

OTHER PUBLICATIONS

EP Search Report dated Aug. 2, 2017 for EP17154563.5 (5 pages).

*Primary Examiner* — Tom P Duong
(74) *Attorney, Agent, or Firm* — Smith, Gambrell & Russell, LLP

(57) ABSTRACT

The present invention relates to a catalyst that comprises a carrier body with a length L, which extends between a first end face 'a' and a second end face 'b', and differently composed, catalytically-active material zones A, B, and C arranged on the carrier body, wherein
 material zone A contains platinum or platinum and palladium with a weight ratio Pt:Pd of ≥1 and, starting from end face 'a' or starting from end face 'b', extends along 70 to 100% of the length L, and
 material zone B contains palladium or platinum and palladium and, starting from end face 'b', extends along a portion of the length L, and
 material zone C contains SCR-active material and, starting from end face 'a', extends along a portion of the length L,
wherein material zone C is arranged above material zone A.

19 Claims, 1 Drawing Sheet

(51) Int. Cl.

| | | |
|---|---|---|
| *B01J 23/42* | (2006.01) | |
| *B01D 53/94* | (2006.01) | |
| *F01N 3/20* | (2006.01) | |
| *F01N 13/00* | (2010.01) | |
| *B01J 23/58* | (2006.01) | |
| *B01J 23/89* | (2006.01) | |
| *B01J 29/072* | (2006.01) | |
| *B01J 35/00* | (2006.01) | |
| *B01J 35/04* | (2006.01) | |
| *B01J 37/02* | (2006.01) | |
| *F01N 3/021* | (2006.01) | |
| *F01N 3/10* | (2006.01) | |

(52) U.S. Cl.
CPC ..... *B01D 53/9418* (2013.01); *B01D 53/9468* (2013.01); *B01D 53/9472* (2013.01); *B01D 53/9477* (2013.01); *B01J 23/42* (2013.01); *B01J 23/58* (2013.01); *B01J 23/8926* (2013.01); *B01J 29/072* (2013.01); *B01J 35/0006* (2013.01); *B01J 35/04* (2013.01); *B01J 37/0225* (2013.01); *B01J 37/0244* (2013.01); *B01J 37/0246* (2013.01); *F01N 3/021* (2013.01); *F01N 3/106* (2013.01); *F01N 3/2066* (2013.01); *F01N 3/2803* (2013.01); *F01N 13/0093* (2014.06); *B01D 2255/1021* (2013.01); *B01D 2255/1023* (2013.01); *B01D 2255/204* (2013.01); *B01D 2255/2042* (2013.01); *B01D 2255/20738* (2013.01); *B01D 2255/20761* (2013.01); *B01D 2255/50* (2013.01); *B01D 2255/904* (2013.01); *B01D 2255/9022* (2013.01); *B01D 2255/9032* (2013.01); *B01D 2258/012* (2013.01); *F01N 2370/02* (2013.01); *F01N 2370/04* (2013.01); *F01N 2510/063* (2013.01); *F01N 2510/0682* (2013.01); *F01N 2510/0684* (2013.01); *F01N 2610/02* (2013.01); *F01N 2610/1453* (2013.01)

(58) Field of Classification Search
USPC .................................................. 422/177, 180
See application file for complete search history.

(56) References Cited

U.S. PATENT DOCUMENTS

| | | | |
|---|---|---|---|
| 6,602,820 B1 | 8/2003 | Goebel et al. | |
| 6,709,644 B2 | 3/2004 | Zones et al. | |
| 8,617,474 B2 | 12/2013 | Bull et al. | |
| 8,667,785 B2* | 3/2014 | Blakeman | B01J 35/0006 60/299 |
| 2004/0209769 A1 | 10/2004 | Demel et al. | |
| 2010/0058746 A1* | 3/2010 | Pfeifer | B01D 53/9468 60/297 |
| 2010/0257843 A1 | 10/2010 | Hoke et al. | |
| 2010/0290964 A1* | 11/2010 | Southward | B01D 53/9468 423/213.5 |
| 2011/0099975 A1* | 5/2011 | Bailey | B01D 53/944 60/274 |
| 2011/0286900 A1* | 11/2011 | Caudle | B01D 53/9436 423/213.5 |
| 2012/0213674 A1 | 8/2012 | Schuetze et al. | |
| 2013/0089481 A1* | 4/2013 | Sumiya | B01J 37/0244 423/213.5 |
| 2013/0302214 A1 | 11/2013 | Pfeifer et al. | |
| 2015/0037233 A1* | 2/2015 | Fedeyko | B01D 53/8628 423/239.1 |
| 2015/0139875 A1 | 5/2015 | Schuetze et al. | |
| 2016/0367941 A1 | 12/2016 | Gilbert et al. | |

FOREIGN PATENT DOCUMENTS

| | | |
|---|---|---|
| EP | 1101528 A2 | 5/2001 |
| EP | 1399246 B1 | 5/2005 |
| EP | 2653681 A1 | 10/2013 |
| EP | 2674584 | 12/2013 |
| EP | 2117707 B1 | 4/2015 |
| GB | 2492175 A | 12/2012 |
| WO | 2008/132452 | 11/2008 |
| WO | 2011/057649 A1 | 5/2011 |
| WO | 2012/079598 A1 | 6/2012 |
| WO | 2014/072717 A1 | 5/2014 |

* cited by examiner

CATALYST FOR PURIFYING THE EXHAUST GASES OF DIESEL ENGINES

The present invention relates to a catalyst for purifying the exhaust gases of diesel engines, said catalyst having several material zones.

In addition to carbon monoxide CO, hydrocarbons HC, and nitrogen oxides $NO_x$, the raw exhaust gas of diesel engines contains a relatively high oxygen content of up to 15 vol %. Particle emissions that predominantly consist of soot residues and possibly organic agglomerates, and originate from a partially incomplete fuel combustion in the cylinder of the engine, are also contained.

While diesel particulate filters with and without a catalytically-active coating are suitable for removing particle emissions, nitrogen oxides may be converted on an SCR catalyst in the presence of oxygen to nitrogen and water by means of ammonia. The ammonia used as reducing agent may be made available by feeding in an ammonia precursor compound, such as, for example, urea, ammonium carbamate, or ammonium formate, into the exhaust gas stream, and by subsequent thermolysis and hydrolysis. SCR catalysts are described extensively in literature. They are generally either so-called mixed oxide catalysts, which contain, in particular, vanadium, titanium, and tungsten, or so-called zeolite catalysts, which comprise a metal-exchanged—in particular, fine-pored-zeolite. SCR-catalytically-active materials may be carried on flow-through substrates or on wall-flow filters.

Carbon monoxide and hydrocarbons are rendered harmless by oxidation on a suitable oxidation catalyst. Oxidation catalysts are also described extensively in the literature. They are, for example, flow-through substrates, which carry precious metals, such as platinum and palladium, as essential, catalytically-active components on large-area, porous, high-melting oxides, such as aluminum oxide.

Also already described are zoned oxidation catalysts that have, in the flow direction of the exhaust gas, material zones of different compositions, with which the exhaust gas comes into contact one after the other.

For example, US2010/257843, US20111099975, and WO2012/079598 A1 describe zoned oxidation catalysts that contain platinum and palladium. WO2011/057649 A1 also describes oxidation catalysts, wherein these may be used in layered and zoned embodiments. In the case of zoned embodiments, the second zone, i.e., the zone with which the downflowing exhaust gas is in direct contact, has a higher precious metal content than the forward zone, which is in direct contact with the inflowing exhaust gas. The oxidation catalysts according to WO2011/057649 A1 have, in particular, the aim of setting an optimal ratio of NO to $NO_2$ for an SCR catalyst located downstream.

In most cases, the various catalysts are combined in an exhaust gas purification system such that an oxidation catalyst is arranged close to the engine, and that a particulate filter and an SCR catalyst then follow in the flow direction of the exhaust gas, wherein the SCR catalyst may also be present supported on the particulate filter. The exhaust gas temperatures of current and future diesel engines of emissions regulations Euro 6 and 6+ are becoming lower and lower as a result of fuel savings leading to reduced $CO_2$ emissions. It has therefore been suggested on several occasions that at least a portion of the nitrogen oxides contained in the exhaust gas be converted by means of an SCR catalyst arranged close to the engine and that the exhaust gas thereafter be first guided through an oxidation catalyst, a particulate filter, and, where applicable, another SCR catalyst.

DETAILED DESCRIPTION

Figure 1:
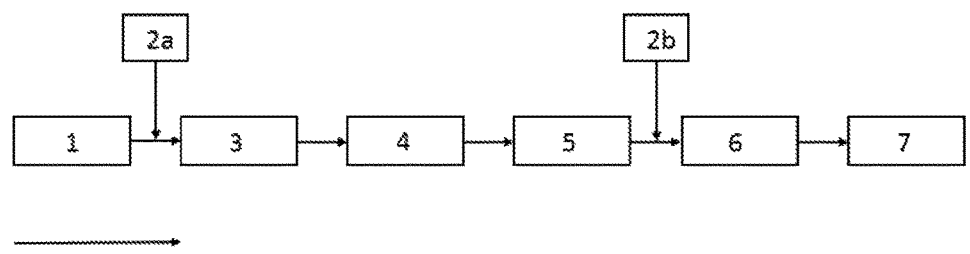
FIG. 1 schematically shows an example of a catalyst arrangement according to the invention.

In this catalyst arrangement, in particular, it is important to have available diesel oxidation catalysts that produce little di-nitrogen monoxide and nonetheless provide enough nitrogen dioxide for the following SCR catalyst.

It has now been found that the diesel oxidation catalysts described and defined below satisfy these conditions.

The present invention relates to a catalyst that comprises a carrier body with a length L, which extends between a first end face 'a' and a second end face 'b', and differently composed, catalytically-active material zones A, B, and C arranged on the carrier body, wherein material zone A contains platinum or platinum and palladium with a weight ratio of Pt:Pd of ≥1 and, starting from end face 'a' or starting from end face 'b', extends along 70 to 100% of the length L, and material zone B contains palladium or platinum and palladium and, starting from end face 'b', extends along a portion of the length L, and material zone C contains SCR-active material and, starting from end face 'a', extends along a portion of the length L.

wherein material zone C is arranged above material zone A.

In embodiments of the catalyst according to the invention, platinum or platinum and palladium are applied in the material zones A and B on one or more carrier oxides. These carrier oxides are advantageously high-melting, i.e., their melting point is at a sufficient distance above the temperatures occurring during specified normal operation of the catalyst according to the invention. The carrier oxides, moreover, have an advantageously large surface area and preferably have BET surfaces of 50 to 200 $m^2/g$ (determined according to DIN 66132).

The carrier oxides in material zones A and B may be the same or different.

Suitable carrier oxides are selected from the group consisting of aluminum oxide, doped aluminum oxide, silicon oxide, titanium oxide, cerium oxide, zirconium oxide, and mixed oxides of one or more thereof.

Doped aluminum oxides are, for example, silicon oxide-, zirconium oxide-, and/or titanium oxide-doped aluminum oxides. Advantageously used is lanthanum-stabilized aluminum oxide, wherein lanthanum is used in quantities of 1 to 10 wt %—preferably, 3 to 6 wt %—respectively calculated as $La_2O_3$ and with respect to the weight of the stabilized aluminum oxide.

If material zone A contains platinum and palladium, the weight ratio Pt:Pd is ≥1, i.e., in particular, 20:1 to 1:1. Examples are 20:1, 12:1, 10:1, 7:1, 6:1, 4:1, 3:1, 2:1, 1.5:1, and 1:1.

If material zone B contains platinum and palladium, the weight ratio Pt:Pd is preferably ≤3, i.e., in particular, 3:1 to 1:12. Examples are 2:1, 1:1, 1:2, and 1:4.

In embodiments of the catalyst according to the invention, material zone A comprises platinum and a transition metal oxide, wherein platinum, in particular, is present in a quantity of 0.05 to 4.0 wt %, and the transition metal oxide is present in quantities of 0.5 to 15 wt %, each with respect to the weight of material zone A.

In one preferred embodiment, the transition metal oxide is $Cu_xO$, where $0<x\leq2$.

If the transition metal oxide is $Cu_xO$, it is, in particular, present in a quantity of 0.5 to 5 wt %, and platinum is present in a quantity of 0.05 to 2 wt %, each with respect to the weight of material zone A.

In embodiments of the catalyst according to the invention, material zone B comprises an alkaline earth metal. As alkaline earth metal, magnesium, calcium, strontium, barium, or mixtures of at least two of these metals can be used. Preferably used are strontium or barium or strontium and barium.

The alkaline earth metal or the alkaline earth metals are generally present in the form of their oxides, hydroxides, or carbonates. They are preferably present in the form of their oxides.

The alkaline earth metal is advantageously used in a quantity of 0.5 to 5 wt % with respect to the weight of material zone B and calculated as MeO, wherein Me represents the alkaline earth metal.

If strontium is used, it is particularly preferably present in a quantity of 1 to 3, with respect to the weight of material zone B.

However, if barium is used, it is particularly preferably present in a quantity of 2.5 to 4.5 wt %, with respect to the weight of material zone A.

In embodiments of the catalyst according to the invention, material zones A and B are present independently of each other in quantities of 25 to 150 g/L, with respect to the volume of the carrier body.

Material zone C contains SCR-active material, i.e., an SCR catalyst.

As SCR catalyst, all active catalysts in the SCR reaction of nitrogen oxides with ammonia—particularly such as are commonly known to the person skilled in the art in the field of automotive exhaust gas catalysis—may, in principle, be used. This includes catalysts of the mixed-oxide type, as well as catalysts based upon zeolites—in particular, upon transition metal-exchanged zeolites.

In embodiments of the present invention, SCR catalysts are used that contain a small-pore zeolite with a maximum ring size of eight tetrahedral atoms and a transition metal. Such SCR catalysts are described in, for example, EP 2 117 707 A1 and WO2008/132452 A2.

In addition, large-pored and medium-pored zeolites may, however, also be used, wherein those of the BEA structure type, in particular, come into consideration. Iron BEA is thus of particular interest.

Particularly preferred zeolites belong to the BEA, AEI, CHA, KFI, ERI, LEV, MER, or DDR structure types and are particularly preferably exchanged with cobalt, iron, copper, or mixtures of two or three of these metals.

The term, "zeolites," within the context of the present invention also includes molecular sieves, which are sometimes also referred to as "zeolite-like" compounds. Molecular sieves are preferred, if they belong to one of the aforementioned structure types. Examples include silica aluminum phosphate zeolites, which are known by the term SAPO, and aluminum phosphate zeolites, which are known by the term AlPO. These, too, are particularly preferred, when they are exchanged with cobalt, iron, copper, or mixtures of two or three of these metals.

Preferred zeolites or molecular sieves are also those that have an SAR (silica-to-alumina) value of 2 to 100—in particular, 5 to 50.

The zeolites or molecular sieves contain transition metal—in particular, in quantities of 1 to 10 wt %, and, especially, 2 to 5 wt %—calculated as metal oxide, i.e., for example, as $Fe_2O_3$ or CuO.

Preferred embodiments of the present invention contain as SCR catalysts zeolites or molecular sieves of the beta type (BEA), chabazite type (CHA), or of the Levyne type (LEV) exchanged with copper, iron, or copper and iron. Appropriate zeolites or molecular sieves are, for example, known by the names ZSM-5, Beta, SSZ-13, SSZ-62, Nu-3, ZK-20, LZ-132, SAPO-34, SAP-35, AlPO-34, and AlPO-35; see also, for example, U.S. Pat. No. 6,709,644 and U.S. Pat. No. 8,617,474.

According to the invention, material zone A, starting from end face 'a' or starting from end face 'b' of the carrier body, extends along 70 to 100% of its length L. In embodiments of the catalyst according to the invention, material zone A extends along 80 to 100%—in particular, 100%—of the length L of the carrier body.

In one embodiment, material zone A starts from end face 'a', and, in another embodiment, from end face 'b' of the carrier body.

In other embodiments of the catalyst according to the invention, material zone B extends along 50% to 70% of the length L of the carrier body.

In other embodiments of the catalyst according to the invention, material zone C extends along 30% to 50% of the length L of the carrier body.

In preferred embodiments, material zone A extends over 100% of the length L of the carrier body and is located directly on the carrier body. Material zones B and C are located, in this case, on material zone A, wherein the sum of the length of material zones B and C corresponds to the length L of the carrier body. The following thus applies: $L=L_B+L_C$, wherein $L_B$ is the length of material zone B, and $L_C$ is the length of material zone C.

Catalysts according to the invention may be produced by coating suitable carrier bodies in a manner known per se by means of coating suspensions, or so-called wash coats. In order to produce a coating suspension for producing material zones A or B, the selected carrier oxides are, for example, suspended in water. Platinum and/or palladium are then added while stirring to the suspension in the desired quantities, in the form of suitable, water-soluble precursor compounds, such as, for example, palladium nitrate or hexahydroxy platinic acid, and, where appropriate, affixed to the carrier material by setting the pH value and/or by adding an auxiliary reagent. Alternatively, the precious metal may also be applied to the carrier material analogously to the method described in EP 1 101 528 A2.

Analogously to the production of a coating suspension, a suitable SCR catalyst possibly with the addition of a binder—is suspended in water, in order to produce material zone C. The suspensions obtained in this way are then ground and applied to the carrier body according to one of the traditional coating methods. After each coating step, the coated part is dried in the hot air stream and, where appropriate, calcinated.

The aforementioned precursor compounds, auxiliary reagents, and binders are known to the person skilled in the art.

In particular, so-called honeycomb bodies made of ceramic—in particular, cordierite—or of metal come into consideration as carrier bodies. So-called flow-through honeycomb bodies are preferably used. Other embodiments are, however, also conceivable, in which wall-flow filters are used as carrier bodies.

The catalysts according to the invention are suitable for purifying the exhaust gases of diesel engines. They are, in particular, able to oxidize carbon monoxide and hydrocarbons to carbon dioxide and water. In addition, they can oxidize ammonia in an SCR reaction by means of nitrogen oxides and, where appropriate, store ammonia temporarily. At the same time, the zone on the downflow side is able to oxidize nitrogen monoxide to nitrogen dioxide.

They are preferably integrated into an exhaust gas purification system such that exhaust gas that has passed an SCR catalyst arranged close to the engine enters the catalyst at end face 'a' and exits it again at end face 'b'.

The present invention thus also relates to a catalyst arrangement comprising, one after the other, a first device for feeding in ammonia or an ammonia precursor, a first SCR catalyst, and a catalyst according to the invention, wherein the catalyst according to the invention is arranged such that its end face 'a' points in the direction of the first SCR catalyst.

A device for feeding in ammonia or an ammonia precursor is, in particular, a device for feeding in an aqueous solution of urea. Such devices are known to the person skilled in the art and can be acquired on the market.

A flow-through substrate that is coated with an SCR-active material comes, in particular, into consideration as first SCR catalyst. In addition to all SCR catalysts of material zone C described above, mixed-oxide catalysts—especially, VWT catalysts—in particular, also come into consideration as SCR-active material. VWT catalysts are catalysts based upon $V_2O_5$, $WO_3$, and $TiO_2$.

The first SCR catalyst preferably comprises a VWT catalyst, or zeolites or molecular sieves of the beta type (BEA), chabazite type (CHA), or of the Levyne type (LEV) exchanged with copper, iron, or copper and iron.

In one embodiment, the catalyst arrangement according to the invention comprises a diesel particulate filter arranged such that it points in the direction of end face 'b' of the catalyst according to the invention. The diesel particulate filter is, in particular, a wall-flow filter. In contrast to a flow-through substrate, in which channels that are open on both ends extend in parallel between the two ends of the flow-through substrate, the channels in the wall-flow filter are closed in a gas-tight manner, alternatingly, either on the first or on the second end. Gas that enters into a channel on one end can thus only exit the wall-flow filter again when it enters through the channel wall into a channel that is open on the other end. The channel walls are generally porous and, in the uncoated state, have porosities of, for example, 30 to 80%—in particular, 50 to 75%. Their average pore size in the uncoated state is, for example, 5 to 30 microns.

In general, the pores of the wall-flow filter are so-called open pores, i.e., they have a connection to the channels. Moreover, the pores are generally connected to each other. On the one hand, this allows for an easy coating of the inner pore surfaces and, on the other, for an easy passage of the exhaust gas through the porous walls of the wall-flow filter.

The diesel particulate filter may be uncoated. However, it preferably comprises a catalytically-active coating that reduces the ignition point of soot, and thus facilitates the burning off of the filtered soot particles. Such coatings comprise, for example, platinum group metals carried on aluminum oxide, such as, in particular, platinum and/or palladium. Particulate filters coated with an SCR catalyst are also conceivable. In this case, a device for feeding in an aqueous solution of urea is provided upstream of the diesel particulate filter.

In a further embodiment, the catalyst arrangement according to the invention comprises a second SCR catalyst, which follows the diesel particulate filter.

A flow-through substrate that is coated with an SCR-catalytically-active material may also be used as second SCR catalyst. All SCR catalysts of material zone C described above come, in particular, into consideration as SCR-catalytically-active material.

The SCR catalyst preferably comprises a VWT catalyst, or zeolites or molecular sieves of the beta type (BEA), chabazite type (CNA), or of the Levyne type (LEV) exchanged with copper, iron, or copper and iron.

A device for feeding in ammonia or an ammonia precursor—in particular, a device for feeding in an aqueous solution of urea—must also be located upstream of the second SCR catalyst.

One embodiment of the catalyst arrangement according to the invention thus comprises, one after the other, a first device for feeding in ammonia or an ammonia precursor, a first SCR catalyst, a catalyst according to the invention, a diesel particulate filter, a second device for feeding in ammonia or an ammonia precursor, and a second SCR catalyst. Another embodiment of the catalyst arrangement according to the invention comprises, one after the other, a first device for feeding in ammonia or an ammonia precursor, a first SCR catalyst, a catalyst according to the invention, a second device for feeding in ammonia or an ammonia precursor, a diesel particulate filter coated with an SCR catalyst, and a second SCR catalyst.

In order to improve the conversion of nitrogen oxides in the second SCR catalyst, it may be necessary to feed in the ammonia in a quantity that is approximately 10 to 20% higher than the quantity required, i.e., in a stoichiometric quantity. This, however, increases the risk of a higher secondary emission—in particular, as a result of increased ammonia slippage. Since ammonia already has a pungent odor in a low concentration and is legally limited in the utility vehicle sector, ammonia slippage must be minimized. For this purpose, so-called ammonia slip catalysts are known, which are arranged in the flow direction of the exhaust gas downstream of an SCR catalyst in order to oxidize ammonia that breaks through. Ammonia slip catalysts in various embodiments are described in, for example, U.S. Pat. No. 5,120,695, EP 1 399 246 A1, and EP 0 559 021 A2.

In a further embodiment, the catalyst arrangement according to the invention therefore comprises an ammonia slip catalyst, which follows the second SCR catalyst.

For example, the ammonia slip catalyst comprises SCR-active material and one or more platinum group metals—in particular, platinum or platinum and palladium. All SCR catalysts of material zone C described above come, in particular, into consideration as SCR-catalytically-active material.

One embodiment of the catalyst arrangement according to the invention thus comprises, one after the other, a first device for feeding in ammonia or an ammonia precursor, a first SCR catalyst, a catalyst according to the invention, a diesel particulate filter, a second device for feeding in ammonia or an ammonia precursor, a second SCR catalyst, and an ammonia slip catalyst.

Another embodiment of the catalyst arrangement according to the invention comprises, one after the other, a first device for feeding in ammonia or an ammonia precursor, a first SCR catalyst, a catalyst according to the invention, a second device for feeding in ammonia or an ammonia precursor, a diesel particulate filter coated with an SCR catalyst, a second SCR catalyst, and an ammonia slip catalyst.

FIG. 1 schematically shows an example of a catalyst arrangement according to the invention. Exhaust gas exiting the engine (1) is first guided through a first SCR catalyst (3) arranged close to the engine. Upstream of the first SCR catalyst (3), an aqueous urea solution, which is hydrolyzed in the exhaust gas stream to ammonia, is fed in via a first dosing apparatus (2a). Exhaust gas exiting the first SCR catalyst then flows through the catalyst (4) according to the invention, through the particulate filter (5), and finally through a second SCR catalyst (6) arranged further downstream. Upstream of the second SCR catalyst (6), an aqueous urea solution, which is hydrolyzed in the exhaust gas stream to ammonia, is also fed in via a second dosing apparatus (2a). Finally, the exhaust gas is guided through the ammonia slip catalyst (7) before it is released into the atmosphere. The arrow denotes the flow direction of the exhaust gas.

Figure 2:
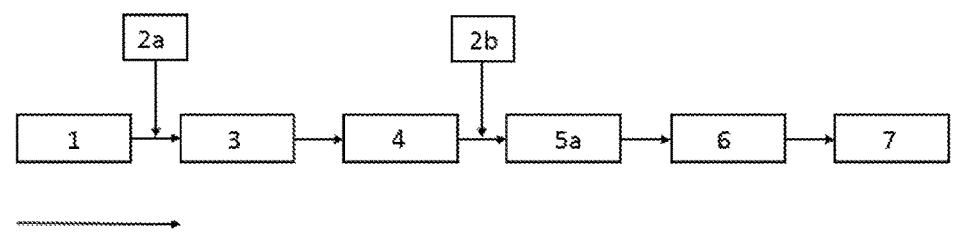
FIG. 2 schematically shows another example of a catalyst arrangement according to the invention.

FIG. 2 schematically shows another example of a catalyst arrangement according to the invention. Exhaust gas exiting the engine (1) is first guided through a first SCR catalyst (3) arranged close to the engine, Upstream of the first SCR catalyst (3), an aqueous urea solution, which is hydrolyzed in the exhaust gas stream to ammonia, is fed in via a first dosing apparatus (2a). Exhaust gas exiting the first SCR catalyst then flows through the catalyst (4) according to the invention, through a particulate filter (5a) coated with an SCR catalyst, and finally through a second SCR catalyst (6) arranged further downstream. In this case, upstream of the particulate filter (5a), an aqueous urea solution, which is hydrolyzed in the exhaust gas stream to ammonia, is fed in via a second dosing apparatus (2a). Finally, the exhaust gas is guided through the ammonia slip catalyst (7) before it is released into the atmosphere. The arrow denotes the flow direction of the exhaust gas.

Example 1 a) A commercially available, round, flow-through substrate made of cordierite, with dimensions of 10.5"×6.00", cell density of 400 cpsi, and wall thickness of 4 mil, was coated, starting from one end (corresponding to end face 'a'), over 100% of its length with a wash coat that contained 75 g/L. of a commercially available, 0.67 g/L Pt, and 0.11 g/L Pd. The weight ratio Pt:Pd was 6:1.

b) The coated substrate obtained according to a) was coated over 50% of its entire length, starting from end face 'b', with a wash coat containing 50 g/L of an Si-doped aluminum oxide, 0.15 g/L of a customary water-soluble Pt compound, and 0.30 g/L of a customary Pd compound. The weight ratio Pt Pd was 1:2.

c) The coated substrate obtained according to b) was coated over 50% of its entire length, starting from end face 'a', with a wash coat containing 200 g/L of a zeolite exchanged with cooper.

Example 2 a) A commercially available, round, flow-through substrate made of cordierite, with dimensions of 10.5"×6.00", cell density of 400 cpsi, and wall thickness of 4 mil, was coated, starting from one end (corresponding to end face 'a'), over 100% of its length with a wash coat that contained 50 g/L of a commercially available aluminum oxide, 0.39 g/L Pt, and 0.10 g/L Pd. The weight ratio Pt:Pd was 4:1.

b) The coated substrate obtained according to a) was coated over 50% of its entire length, starting from end face 'b', with a wash coat containing 70 g/L of an Si-doped aluminum oxide, 0.37 g/L of a customary water-soluble Pt compound, and 0.37 g/L of a customary water-soluble Pd compound. The weight ratio Pt:Pd was 1:1.

c) The coated substrate obtained according to b) was coated over 50% of its entire length, starting from end face 'a', with a wash coat containing 160 g/L of a zeolite exchanged with iron.

The invention claimed is:

1. Catalyst that comprises a carrier body with a length L, which extends between a first end face 'a' and a second end face 'b', and
differently composed, catalytically-active material zones A, B, and C arranged on the carrier body, wherein
material zone A contains platinum or platinum and palladium with a weight ratio Pt:Pd of ≥1 and, starting from end face 'a' or starting from end face 'b', extends along 70 to 100% of the length L, and
material zone B contains palladium or platinum and palladium and, starting from end face 'b', extends along a portion of the length L, and
material zone C contains SCR-active material and, starting from end face 'a', extends along a portion of the length L,
wherein material zone C is arranged above material zone A.

2. Catalyst according to claim 1, characterized in that material zone A contains platinum or platinum and palladium with a weight ratio of 20:1 to 1:1.

3. Catalyst according to claim 1, characterized in that material zone B contains palladium or platinum and palladium with a weight ratio of 3:1 to 1:12.

4. Catalyst according to claim 1, characterized in that material zone A comprises platinum and a transition metal oxide.

5. Catalyst according to claim 4, characterized in that platinum is present in a quantity of 0.05 to 4.0 wt %, and the transition metal oxide is present in quantities of 0.5 to 15 wt %, each with respect to the weight of material zone A.

6. Catalyst according to claim 4, characterized in that the transition metal oxide is $Cu_xO$, where $0<x\leq 2$.

7. Catalyst according to claim 6, characterized in that $Cu_xO$ is present in a quantity of 0.5 to 5 wt %, and platinum is present in quantities of 0.05 to 2.0 wt %, each with respect to the weight of material zone A.

8. Catalyst according to claim 1, characterized in that material zone B contains an alkaline earth metal.

9. Catalyst according to claim 8, characterized in that the alkaline earth metal in material zone B is strontium or barium or strontium and barium.

10. Catalyst according to claim 1, characterized in that material zone C contains as SCR-active material a small-pore zeolite having a maximum ring size of eight tetrahedral atoms and containing a transition metal.

11. Catalyst according to claim 10, characterized in that the small-pore zeolite belongs to the AEI, CHA, KFI, ERI, LEV, MER, or DDR structure type and is exchanged with cobalt, iron, copper, or mixtures of two or three of these metals.

12. Catalyst according to claim 1, characterized in that material zone C contains as SCR-active material a zeolite having the structure type BEA and containing a transition metal.

13. Catalyst according to claim 1, characterized in that material zone B extends along 30 to 50% of the length L of the carrier body.

14. Catalyst according to claim 1, characterized in that material zone C extends along 50 to 70% of the length L of the carrier body.

15. Catalyst arrangement comprising, one after the other, a first device for feeding in ammonia or an ammonia precursor, a first SCR catalyst, and another catalyst according to claim 1, wherein the another catalyst is arranged such that its end face 'a' points in the direction of the first SCR catalyst.

16. Catalyst arrangement according to claim 15, characterized in that it comprises a diesel particulate filter arranged so as to point in the direction of end face 'b' of the another catalyst.

17. Catalyst arrangement according to claim 16, characterized in that it comprises a second SCR catalyst, which follows the diesel particulate filter.

18. Catalyst arrangement according to claim 17, characterized in that it comprises a second device for feeding in ammonia or an ammonia precursor upstream of the second SCR catalyst.

19. Catalyst arrangement according to claim 17, characterized in that it comprises an ammonia slip catalyst, which follows the second SCR catalyst.

* * * * *